United States Patent [19]

Muller

[11] Patent Number: 4,913,281

[45] Date of Patent: Apr. 3, 1990

[54] ADJUSTABLE SELF-ALIGNING SPRING SYSTEM FOR VIBRATORY MATERIAL FEEDERS

[75] Inventor: A. Rudolph Muller, Seon, Switzerland

[73] Assignee: K-Tron International, Inc., Pitman, N.J.

[21] Appl. No.: 350,152

[22] Filed: May 8, 1989

[51] Int. Cl.⁴ ............................................. B65G 27/08
[52] U.S. Cl. .................................. 198/763; 267/158; 267/260; 267/265
[58] Field of Search ................ 198/763; 267/158, 260, 267/265, 266

[56] References Cited

U.S. PATENT DOCUMENTS

| | | | |
|---|---|---|---|
| 1,872,311 | 8/1932 | Lyman | 267/266 |
| 1,947,935 | 2/1934 | Gibson | 267/158 |
| 2,332,600 | 10/1943 | Rapp | 198/763 |
| 2,997,158 | 8/1961 | Moskowitz et al. | |
| 3,845,857 | 11/1974 | Doty | 198/763 |
| 4,356,911 | 11/1982 | Brown | |

FOREIGN PATENT DOCUMENTS

| | | | |
|---|---|---|---|
| 369074 | 7/1973 | U.S.S.R. | 198/763 |
| 161352 | 4/1921 | United Kingdom | 267/266 |

Primary Examiner—Joseph E. Valenza

Attorney, Agent, or Firm—Oliff & Berridge

[57] ABSTRACT

An actuator for a vibratory material feeder comprises a base, a tray support, at least one spring for mechanically coupling the base and tray support, and a spring mount for mounting the spring to an actuator mounting surface on one of the base and tray support. The spring mount comprises first and second bearings each having a spring-abutting surface for supporting the spring therebetween, an arcuate surface and at least one hole therethrough; first and second bearing blocks each having an arcuate surface for mating with the arcuate surface of a corresponding one of the first and second bearings, and at least one hole therethrough. One of the bearing blocks abuts the actuator mounting surface. The spring mount further comprises at least one fastener having a shaft extending through the at least one hole of each of the first and second bearings and bearing blocks and a corresponding at least one hole in the spring. The fastener engages the base or tray support such that the first and second bearings are fixedly secured between the first and second bearing blocks when the fastener is in a tightened condition. Further, the at least one hole of each of the first and second bearings and the spring are larger than the fastener shaft, such that the first and second bearings and spring are together pivotable relative to the first and second bearing blocks when the fastener is in an untightened condition.

6 Claims, 4 Drawing Sheets

ADJUSTABLE SELF-ALIGNING SPRING SYSTEM FOR VIBRATORY MATERIAL FEEDERS

BACKGROUND OF THE INVENTION

1. Field of the Invention

The present invention relates generally to vibratory material feeders, and in particular to spring systems for vibratory feeder drives.

2. Related Art

Vibratory feeders basically comprise material trays which are connected via spring arrangements to shock-mounted drives or actuators, which impart vibratory movement to the trays via the spring arrangements for movement of material disposed on the trays in a series of jumps or throws. The distance of the throws is a function of the tray displacement magnitude and frequency, and the displacement or throw angle.

In order to be able to use the same actuator with different sized trays having significantly different masses, it is necessary to be able to change the connecting springs. Further, it is desirable to mount the front and rear springs at differing inclinations relative to the path of tray displacement in order to compensate for rotational or rocking motion of the tray and to adjust the "flip ratio", i.e., the ratio of the vertical components of throws at the outlet B and inlet A, respectively, of a tray. (It will be appreciated that for any throw angle a throw will have vertical v and horizontal h components. The vertical component $v_B$ must always be larger than $v_A$ so that the material is accelerated from the inlet to the outlet. The ratio $v_B/v_A$ preferably should be <2, but never 1. As the actuator works to displace the tray in a rearward direction, the rear shock mounts (adjacent the tray inlet A) sag, which causes $v_B$ to increase and $v_A$ to decrease. This can be corrected by enlarging the vertical component of the rear spring.)

In view of the foregoing, spring mounting arrangements have been developed which permit spring replacement and adjustment of the spring inclination. Two examples of such adjustably mounted springs are disclosed in U.S. Pat. Nos. 4,356,911 to Brown and 2,997,158 to Moskowitz et al. In the Brown arrangement, front and rear leaf springs are each clamped to a pair of spaced mounting blocks which are in turn pivotably mounted to vertical support surfaces by screws aligned on a common laterally extending axis. When the block mounting screws are loosened, the blocks may be pivoted about the common axis to adjust the transverse angle inclination of the associated spring relative to a vertical line, and thereby adjust the vertical component of tray displacement. In the Moskowitz et al arrangement, the support springs are mounted on non-parallel planar support faces with removable clamps which are connected to the actuator base through resilient mounts. To adjust the degree of front end flip, Moskowitz proposes either to change the angles of the springs by machining the support faces or changing the effective lengths of the mounting clamp resilient mounts using insertable shims; or to change the stiffness of the springs or the positions of the resilient clamp mounts relative to the center of gravity of the actuator base.

Both of the foregoing spring mounting arrangements have a number of disadvantages. For example, the Brown arrangement is relatively complex and requires precise machining of the screw mounting holes and positioning of the respective support surfaces to ensure that the mounting blocks for each spring have a common pivot axis. In the case of the Moskowitz et al arrangement, only the proposed shims can be used without structurally modifying the remainder of the actuator, and even the shims require substantial disassembly of the actuator.

SUMMARY OF THE INVENTION

It is accordingly a principal object of the present invention to provide an adjustable spring mounting arrangement which is simple to manufacture, and simple to use.

It is a further object of the present invention to provide an adjustable spring mounting arrangement which does not require precision manufacture of any component.

These and other objects are achieved in accordance with the present invention by a spring mount assembly comprising a pair of first and second bearings each having a spring-abutting surface for a spring disposed therebetween, an arcuate surface, and at least one hole therethrough; and a pair of first and second bearing blocks each having an arcuate surface for mating with the arcuate surface of a corresponding one of the first and second bearings, and a corresponding at least one hole therethrough. The first bearing block also has a further surface for abutting an actuator mounting surface on the actuator base or tray support. The spring mount assembly further comprises a corresponding at least one fastener having a shaft extending through the at least one hole of each of the first and second bearings and bearing blocks for engagement with the actuator base or tray support such that the first and second bearings are fixedly secured between the first and second bearing blocks when a spring is disposed between the first and second bearings, the first bearing block further surface abuts the actuator mounting surface, and the fastener is in a tightened condition. Further, the at least one hole of each of the first and second bearings is larger than the fastener shaft, such that the first and second bearings are pivotable relative to the first and second bearing blocks when the at least one fastener is in an untightened condition.

In accordance with a further aspect of the present invention, the first and second bearings advantageously have a semi-cylindrical shape defining a flat face constituting the spring-abutting surface and a circular face constituting the arcuate surface. Further, the first and second bearings and bearing blocks advantageously are elongate members, and a circular groove in each of the bearing blocks forms the mating arcuate surface.

These and other objects, features and advantages of the present invention will be described in or apparent from the following detailed description of preferred embodiments.

BRIEF DESCRIPTION OF THE DRAWING

The preferred embodiments will be described with reference to the drawing, in which like elements have been denoted with like reference numerals throughout the figures, and in which.

DETAILED DESCRIPTION OF THE PREFERRED EMBODIMENTS

Figure 1:
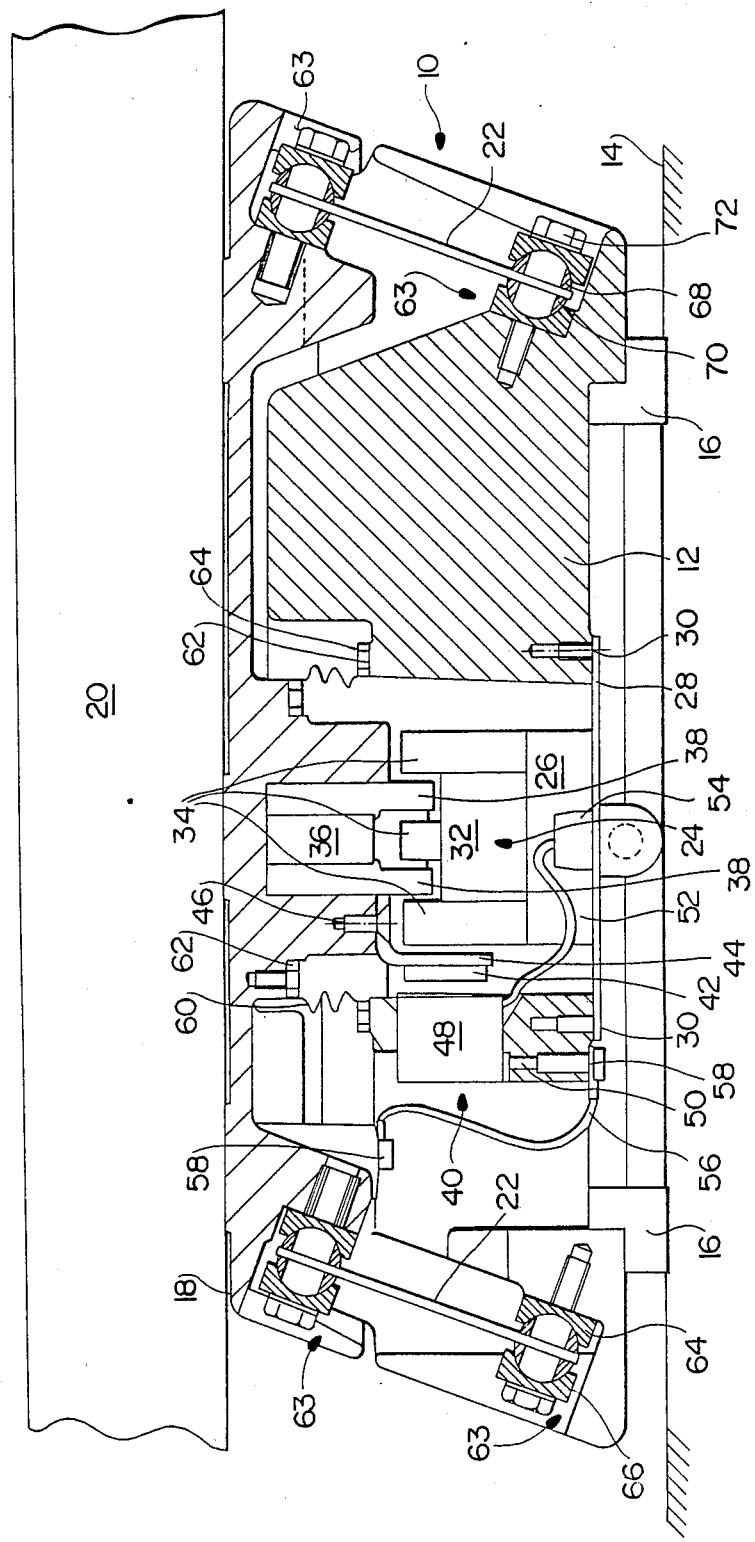
FIG. 1 is a side elevational cross-section view of a vibratory feeder actuator according to the present invention.

Referring to FIG. 1, the electromechanical driver or actuator 10 of a vibratory feeder constructed in accordance with the present invention comprises a stationary base 12 which is anchored to a supporting foundation 14 of the feeder by resilient shock mounts 16; and a support 18 for the feeder tray 20 which is mechanically coupled to base 12 for oscillatory movement by leaf springs 22.

An electromagnet or drive coil 24 is mounted on an angle bracket 26, which is in turn mounted on a support plate 28 fastened to base 12 by screws 30. Drive coil 24 advantageously comprises an E-shaped, coil-wrapped core 32 having three spaced upstanding legs 34. A C-shaped permanent magnet 36 having two space depending legs 38 is mounted in tray support 18 opposite drive coil 24 such that magnet legs 38 are interposed between the end drive coil legs 34 and straddle the middle drive coil leg 34.

Actuator 10 further includes a tray displacement sensor 40 comprising a permanent magnet 42 mounted to tray support 18 by an angle bracket 44 fastened to support 18 by a screw 46, and a feedback coil 48 mounted in base 12. The position of feedback coil 48 relative to magnet 42 is adjustable by a set screw 50. The signal leads 52 for feedback coil 48 are connected to a socket 54, to which the drive coil leads (not shown) are also connected. A ground wire 56 is connected between base 12 and support 18 by screws 58.

A bellows 60, which is mounted to base 12 and support 18 by upper and lower pressure rings 62 fastened to tray support 18 and base 12, respectively, by screws 64, is also provided to seal drive coil 24, magnet 36 and sensor 40 from contamination by dust and the like.

Figure 3A:
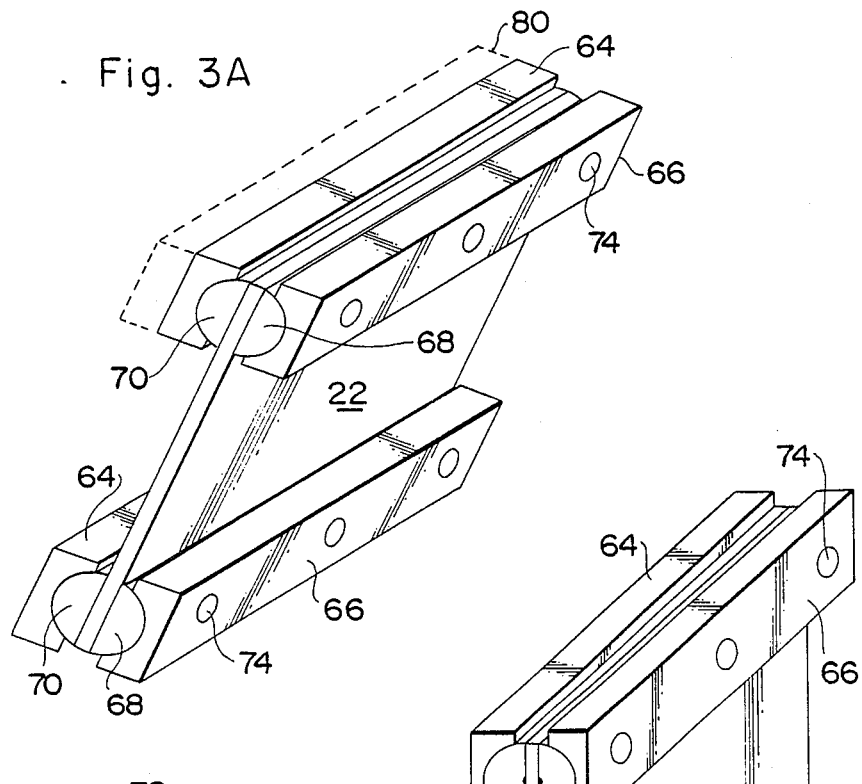
FIGS. 3A and 3B are perspective views of the spring mounting arrangement shown in FIG. 1.
Figure 2:
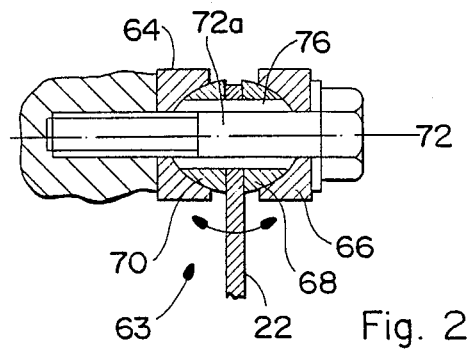
FIG. 2 is an enlarged cross-sectional view of the spring mounting arrangement shown in FIG. 1.
Figure 3B:
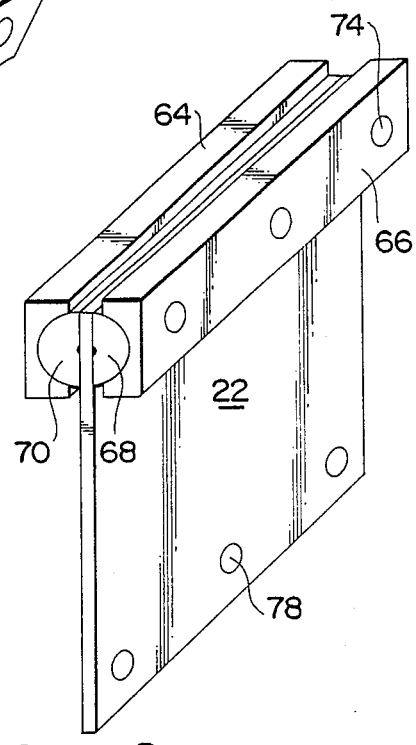

In accordance with the present invention, springs 22 are mounted to mounting surfaces of base 12 and tray support 18 using mounts generally denoted 63, which each comprise a pair of bearing blocks 64, 66, a pair of bearings 68, 70 and a plurality of fastening screws 72. As shown in FIGS. 2 and 3A and 3B, bearings 68, 70 are semi-cylindrical rods, the flat faces of which abut the associated spring 22, and the circular faces of which are seated in mating circular concave grooves formed in the interior faces of bearing blocks 64, 66. A plurality of holes 74, 76 and 78 are formed in bearing blocks 64, 66, bearings 68, 70 and springs 22, respectively, for receiving fastening screws 72. Holes 74 in bearing blocks 64, 66 preferably are dimensioned to have a mating relationship with the shafts of screws 72. Holes 76 in bearings 68, 70 and holes 78 in springs 22 are dimensioned to have a larger diameter than that of the shafts 72a of screws 72, so that when screws 72 are mounted in holes 74-78, there is clearance between the screw shafts 72a and the peripheries of holes 76 and 78 which allow bearings 68, 70, and hence springs 22, to be pivoted relative to bearing blocks 64, 66 when screws 72 are loosely fastened in the associated base 12/tray support 18.

In view of the foregoing, it will be appreciated that spring mounts 63 permit springs 22 to be easily and securely clamped to base 12 and tray support 18 when screws 72 are tightened, and also permit the angles of inclination of springs 22 to be independently adjusted to alter the throw angle simply by loosening the associated fastening screws. It will also be appreciated that the simple adjustability provided by spring mounts 63 allows the lengths of base 12 and tray support 18, and the spring mounting surfaces on base 12 and tray support 18 to be manufactured to lower tolerances; and also allows springs 22 of different thicknesses to be readily exchanged without modification of the mounting members. Further, the spring mounts of the present invention also permit the exact adjustment of the air gap between magnet 36 and drive coil 24, and allows springs 22 to be adjusted so that they are free of tension in a resting condition.

Figure 4:
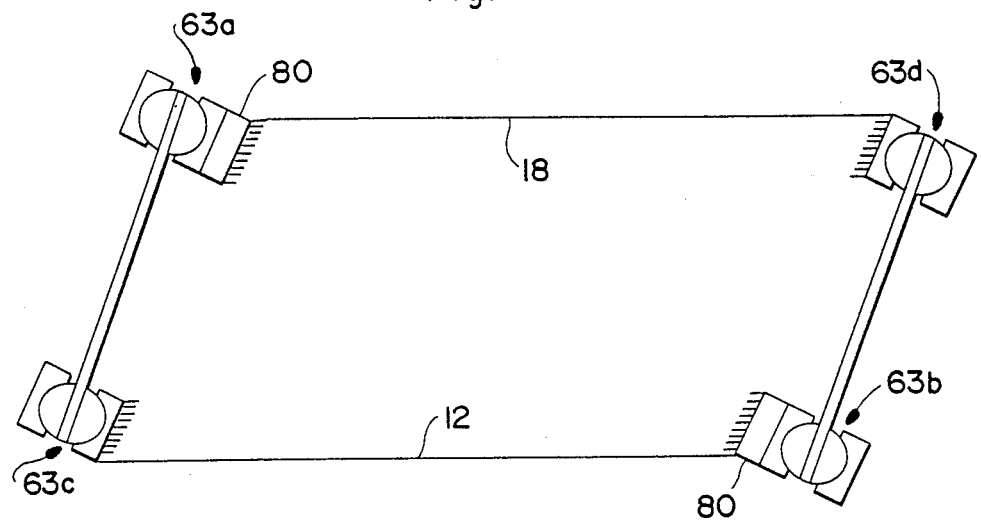
FIGS. 4–7 are diagrammatic illustrations of modified spring mounting arrangements according to the present invention.
Figure 5:
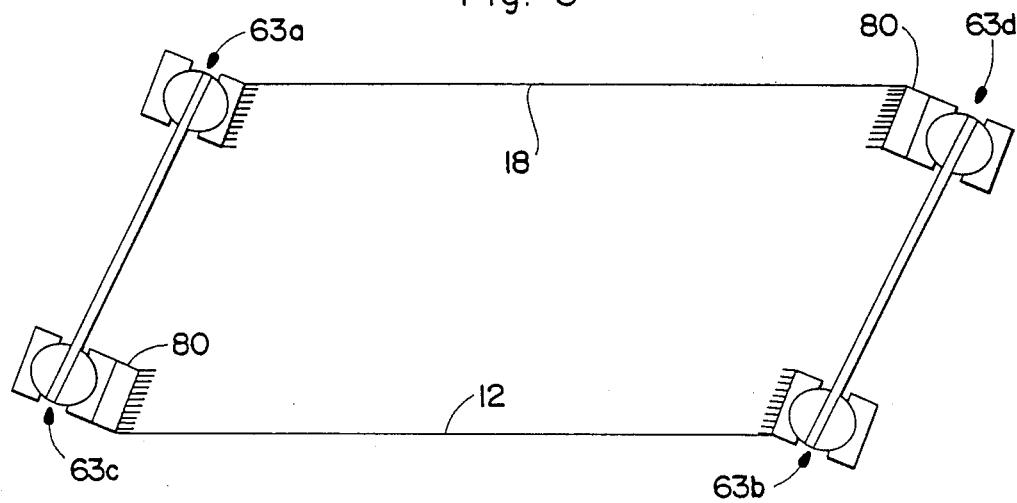
Figure 6:
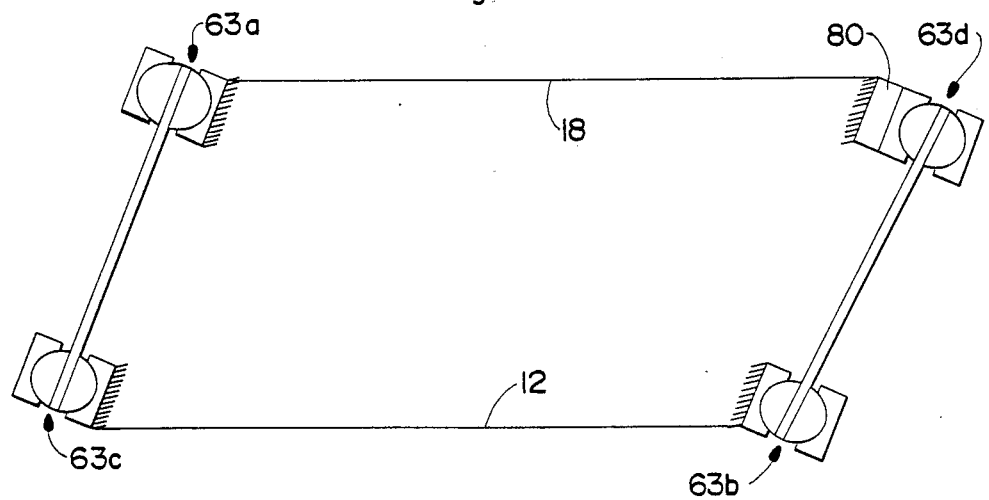
Figure 7:
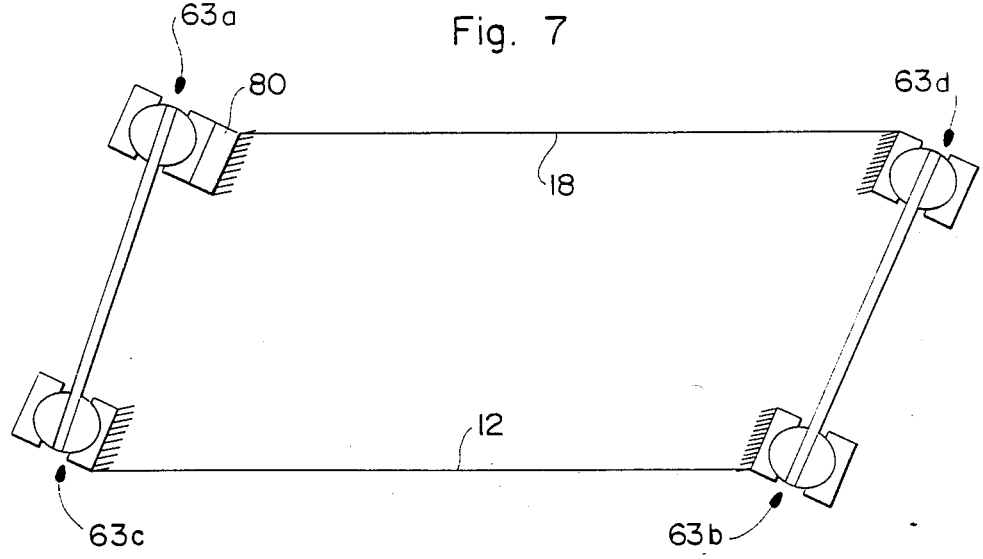

In addition, as shown in FIGS. 4–8, in accordance with the present invention the throw angle can be increased or decreased by several degrees, and the flip ratio changed, simply by adding spacers 80 between a selected one or ones of the interior bearing blocks 64 and the associated base/tray support spring mounting surfaces. Specifically, as shown in FIG. 4, the throw angle can be decreased by placing spacers 80 in the upper front spring mount 63a and lower rear spring mount 63b. As shown in FIG. 5, the throw angle can be increased by placing spaces 80 in the lower front spring mount 63c and the upper rear spring mount 63d. As shown in FIGS. 6 and 7, respectively, the flip ratio can be improved either by placing a spacer 80 in the upper rear spring mount 63d or in the upper front spring mount 63a.

While the present invention has been described with respect to preferred embodiments, it will be appreciated that modifications can be made without departing from the spirit or scope of the invention.

What is claimed is:

1. A spring mount assembly for a vibratory material feeder comprising an actuator for vibrating a material tray, the actuator comprising a base and a tray support which are mechanically coupled together by spring means, said spring mount assembly comprising:
   a pair of first and second bearings each having a spring-abutting surface for a spring disposed therebetween, an arcuate surface, and at least one hole therethrough;
   a pair of first and second bearing blocks each having an arcuate surface for mating with the arcuate surface of a corresponding one of said first and second bearings, and a corresponding at least one hole therethrough, said first bearing block having a further surface for abutting an actuator mounting surface on the actuator base or tray support;
   a corresponding at least one fastener having a shaft extending through said at least one hole of each of said first and second bearings and bearing blocks for engagement with the actuator base or tray support such that said first and second bearings are fixedly secured between said first and second bearing blocks when a spring is disposed between said first and second bearings, said first bearing block abutting surface abuts the actuator mounting surface, and said fastener is in a tightened condition;
   said at least one hole of each of said first and second bearings being larger than said fastener shaft, such that said first and second bearings are pivotable relative to said first and second bearing blocks when said at least one fastener is in an untightened condition.

2. The spring mount of claim 1 wherein said first and second bearings have a semi-cylindrical shape defining a flat face constituting said spring-abutting surface and a circular face constituting said arcuate surface.

3. The spring mount of claim 2 wherein elongate members constitute first and second bearings and bearing blocks, and a circular groove in each of said bearing blocks forms said mating arcuate surface.

4. An actuator for a vibratory material feeder comprising:

base means;

tray support means;

spring means for mechanically coupling said base means and said tray support means;

spring mount means for mounting said spring means to an actuator mounting surface on one of said base and tray support means comprising:

first and second bearing means each having a spring-abutting surface for supporting said spring means therebetween, an arcuate surface, and at least one hole therethrough;

first and second bearing block means each having an arcuate surface for mating with the arcuate surface of a corresponding one of said first and second bearing means, and at least one hole therethrough, said first bearing block means abutting said actuator mounting surface;

corresponding at least one fastener means having a shaft extending through said at least one hole of each of said first and second bearing means and bearing block means and a corresponding at least one hole in said spring means, and engaging said base means or tray support means such that said first and second bearing means are fixedly secured between said first and second bearing block means when said fastener means is in a tightened condition;

said at least one hole of each of said first and second bearing means and said spring means being larger than said fastener means shaft, such that said first and second bearing means and said spring means are together pivotable relative to said first and second bearing blocks when said at least one fastener is in an untightened condition.

5. The actuator of claim 4 wherein said first and second bearing means each has a semi-cylindrical shape defining a flat face constituting said spring-abutting surface and a circular face constituting said arcuate surface.

6. The actuator of claim 5 wherein elongate members constitute said first and second bearing means and bearing block means, and a circular groove in each of said bearing block means forms said mating arcuate surface.

* * * * *